A. LUTZE.
CONVEYING AND DISCHARGING DEVICE FOR USE IN BAKERIES OR THE LIKE.
APPLICATION FILED DEC. 24, 1910.

1,028,762.

Patented June 4, 1912.
3 SHEETS—SHEET 2.

A. LUTZE.
CONVEYING AND DISCHARGING DEVICE FOR USE IN BAKERIES OR THE LIKE.
APPLICATION FILED DEC. 24, 1910.

1,028,762.

Patented June 4, 1912.

Witnesses:
E. B. McBath
B. J. Bishop

Inventor
Alfred Lutze
By Chas. E. Brock
Atty.

UNITED STATES PATENT OFFICE.

ALFRED LUTZE, OF HALLE-ON-THE-SAALE, GERMANY.

CONVEYING AND DISCHARGING DEVICE FOR USE IN BAKERIES OR THE LIKE.

1,028,762.  Specification of Letters Patent.  Patented June 4, 1912.

Application filed December 24, 1910. Serial No. 599,082.

*To all whom it may concern:*

Be it known that I, ALFRED LUTZE, a subject of the Emperor of Germany, residing at 45ᶠ Merseburgerstrasse, Halle-on-the Saale, Germany, manufacturer, have invented certain new and useful Improvements in Conveying and Discharging Devices for Use in Bakeries or the Like, of which the following is a specification.

In bakeries the dough is usually prepared in large troughs whence it is introduced into special machines by which the finished dough is divided according to the size of the loaves, so that each loaf is of a predetermined weight. As the feed hopper or chamber in dividing machines of this kind is as a rule located at a comparatively high level and the troughs containing the dough, owing to their weight cannot very well be lifted and tilted by manual force, the discharge of the troughs must be effected by removing the dough either by hand or with the aid of scoops or the like. This mode of discharging the troughs, however, is an extremely cumbersome and un-economical performance and it has moreover the drawback that the dough becomes cold and its fermentation is thereby impeded. These draw-backs are overcome according to the present invention by providing the machines serving for the division of the dough with a device by means of which the filled troughs are automatically raised up to a certain height and then are discharged by being appropriately rocked or tilted.

A device according to this invention is shown by way of example in the accompanying drawings in which—

Figure 1:
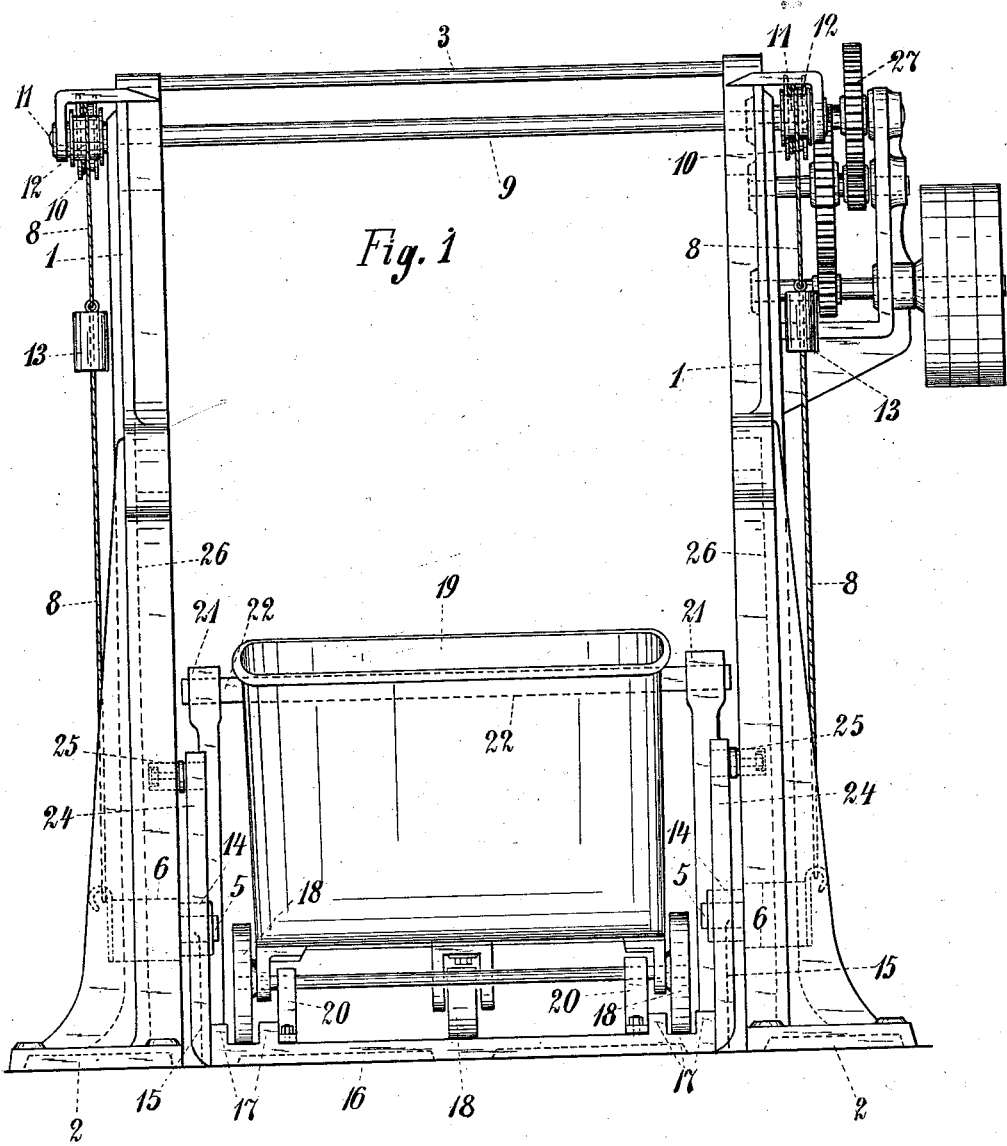
Figure 2:
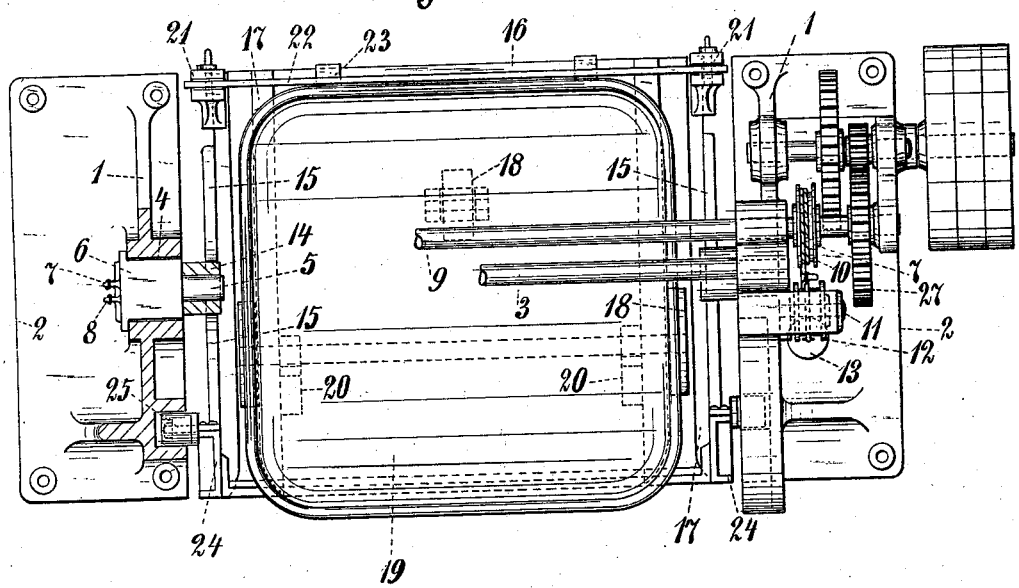
Figure 3:
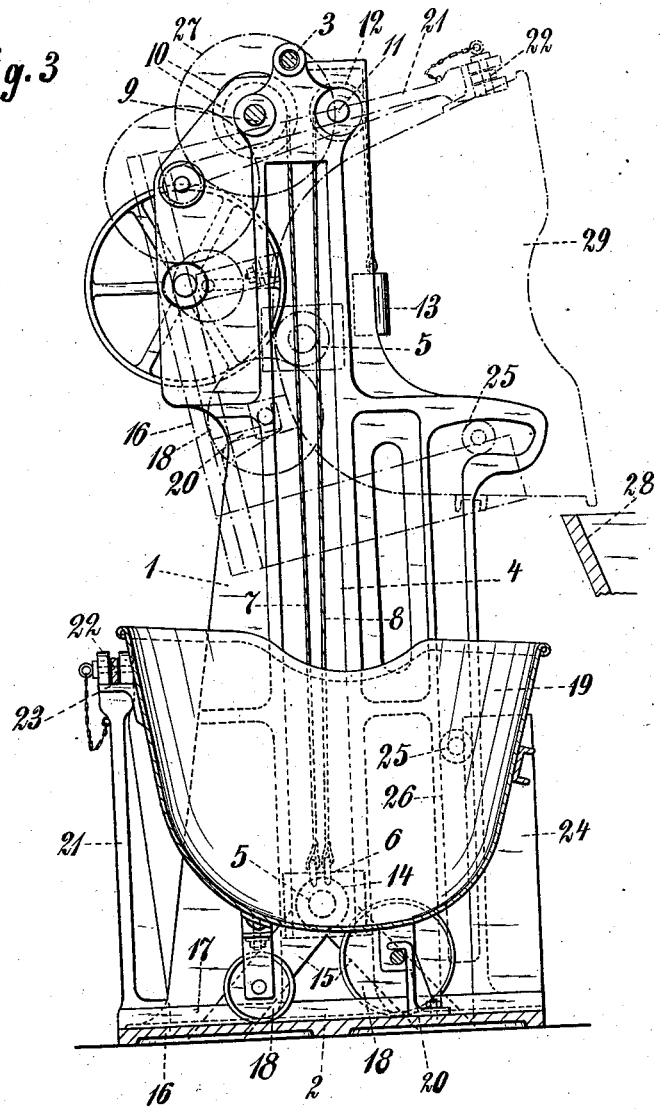

Figure 1 represents a lateral view of a trough-hoisting and discharging device, Fig. 2 is a plan view partially in section and Fig. 3 is a cross sectional view thereof.

The device consists of two standards 1 of an appropriate height provided with base portions 2 resting on the floor, and at the upper part connected and braced by a cross beam 3. Each standard is provided with a central longitudinal slot 4 and guided in these slots by means of pins 5 are cross heads or blocks 6 of which each is suspended from two wire ropes 7, 8 the ropes 7 being secured or partially wound on to sheaves 10, mounted on a common rotatable shaft 9 and the ropes 8 being guided over rollers 12 rotatably journaled on pivots 11 secured in the standards 1 and being held taut by weights 13, 13 attached to their ends.

Loosely fitted on the pin 5 of each cross head 6 is a gland 14 which by means of two arms 15 depending from it is connected to a rectangularly shaped plate 16 provided with special rails 17 on to which the dough carrier or trough 19 provided with wheels 18 is brought when in its initial or lowest position. When the trough 19 reaches the rails 17 its front wheel axle comes to lie beneath two hooks 20 with which the plate 16 is fitted and by which the movement of the trough 19 is limited and its rising from the plate 16 is prevented. Arranged on the two corners at the in-coming side of the plate 16 are two upright posts 21 having slotted heads adapted to receive a rail 22 which on being inserted comes to rest upon projections 23 on the trough 19 and on being appropriately connected with the posts 21 holds the trough 19 in its position. Arranged at the other two corners of the plate 16 are two upright posts 24 carrying at a certain height outwardly projecting rollers 25 engaging with U-shaped guide ways 26 connected with or provided in the standards 1. The guide ways 26 form at their upper end a loop or bend in forward direction. The shaft 9 carrying the sheaves 10 is connected by means of a toothed wheel 27 at a desired transmission ratio, with an intermediate gear driven by means of a belt arrangement for instance from the dough dividing machine.

The operation of the device is as follows:—In the lowest position of the plate 16, in which it is resting on the floor the trough 19 containing the dough is driven on to the plate 16 and fixed thereon in the manner above indicated. This being done the driving belt is in a known manner shifted from the idle to the fast pulley of an appropriate shift gear so as to couple it with the driving gear. The shaft 9 is thereby rotated and the ropes 7 attached to the cross heads 6 are wound on assisted by the weights 13 attached to the ropes 8, and in lifting the plate 16 and the trough 19 the former is guided by the rollers 25 and guide ways 26. During this upward movement the rollers 25 travel on to the outwardly extending loop portion of the guide ways 26 thereby causing the plate 16 together with the trough 19 to be rocked about a certain angle and to discharge the trough 19 the contents of which are poured into the hopper or feed portion 28 of the dough dividing machine arranged in proximity thereto. During the discharge of the trough 19 its center of gravity is maintained owing to the pendulum suspension of the plate 16 whereby the outwardly extending loop portion of the guideways 26 is relieved of any material strain. On the discharge of the trough 19 being effected, in order to release the trough carrier for its return the driving belt is shifted over to the idle pulley of the gear or if desired a second driving belt is shifted into operative position so as to effect this return movement of the plate 16 together with the trough 19 during which the weights 13 and the friction occurring during the unwinding of the ropes 7 in the gear so influence the downward movement of the plate 16 as to cause its descent to take place smoothly and gradually without shocks.

What I claim and desire to secure by Letters Patent is:

A vertically movable plate having a track thereon adapted to receive a wheeled trough, a hook carried by the plate and adapted to engage the front axle of the trough, projections on the upper rear portion of the trough, posts carried by the plate, a bar adapted to pass through the posts and rest on said projections and means for lifting and tilting the plate.

In testimony whereof I have signed my name to this specification in the presence of two subscribing witnesses.

ALFRED LUTZE.

Witnesses:
  MORITZ SPENCER,
  RUDOLPH FRICKE.

Copies of this patent may be obtained for five cents each, by addressing the "Commissioner of Patents, Washington, D. C."